May 31, 1949.　　　P. L. HOWLAND　　　2,471,690
AUXILIARY THROTTLE VALVE CONTROL
Filed July 14, 1947

PAUL L. HOWLAND
INVENTOR

BY Hubert Miller
ATTORNEY

Patented May 31, 1949

2,471,690

UNITED STATES PATENT OFFICE 2,471,690

AUXILIARY THROTTLE VALVE CONTROL

Paul L. Howland, Wichita, Kans.

Application July 14, 1947, Serial No. 760,913

8 Claims. (Cl. 192—.058)

This invention relates to a throttle valve controlling mechanism for internal combustion engine driven vehicles, primarily cross country trucks and busses.

It is the general object of the invention to provide throttle control mechanism which will maintain the engine throttle at any desired setting on cross country trips without continuous foot pressure by the driver on the accelerator pedal, yet which will instantly permit the engine throttle to freely return to "idle" setting the instant the driver slightly depresses either the foot brake or clutch.

It is a further object to provide a mechanism of this type which is normally inoperative in city driving, and which comes into operation only after the engine throttle has been opened sufficiently to bring the vehicle up to the speed which it is desired to maintain on the open highway.

Another object is to provide a control of this type which, while maintaining the engine throttle at a minimum predetermined setting, will freely permit the foot accelerator to open the throttle beyond this minimum setting, yet will again take over control when pressure on the foot accelerator is released, and will continue to maintain the minimum predetermined throttle setting.

Another object is to provide a throttle control mechanism which includes a safety feature which will prevent the throttle from being held open in city driving during fast acceleration in low and second gears.

Figure 1:
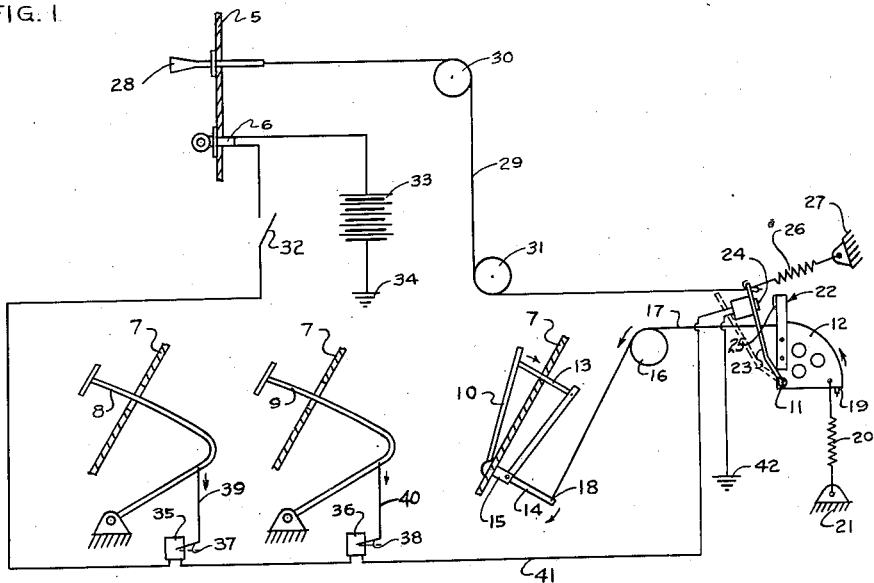
Figure 2:
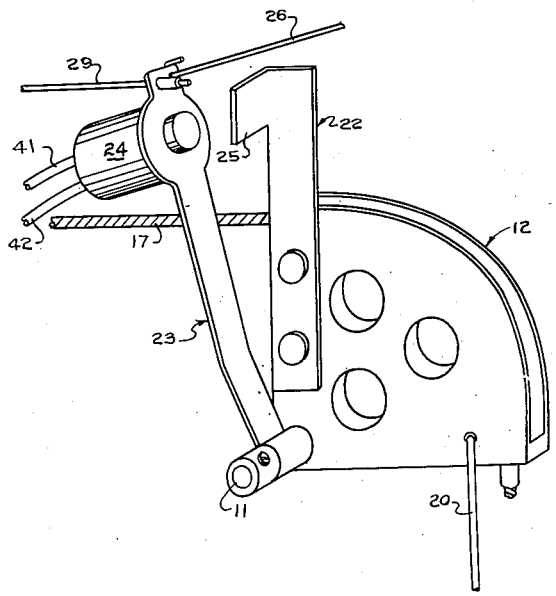

The invention will be better understood from the following description when it is read in connection with the accompanying drawings, which have been chosen for illustrative purposes only, and in which:

Figure 1 is a diagrammatic view of the invention installed on a vehicle, and includes an electrical wiring diagram; and Figure 2 is an isometric view of certain parts of the mechanism showing details in construction and assembly.

As will be understood, the invention is used in conjunction with certain conventional parts of an engine driven vehicle. In Figure 1 the following conventional parts of the vehicle are designated by their respective numerals: Instrument panel 5, ignition switch 6, floor boards 7, clutch pedal 8, brake pedal 9, foot accelerator 10, carburetor feed valve shaft 11, and shaft rotating quadrant 12. The operating linkage between the foot accelerator 10 and the shaft 11 includes a link 13, a bell crank 14 mounted on a bracket 15, a pulley 16, and a cable 17 running from one end of the bell crank at 18, over the pulley 16 and over the quadrant 12, being anchored thereto by any suitable means at the point 19. A spring 20 anchored to the vehicle structure at 21 urges the quadrant 12 and the shaft 11 in an engine idling direction. As stated, all the structure and throttle control mechanism thus far described is conventional, and will be well understood by those familiar with the art.

The invention contemplates the rigid attachment of a magnet contacting member 22 to the shaft 11 so that when the shaft 11 is rotated by the quadrant 12 this member 22 and the shaft will move in unison. In addition, an arm 23 has one of its ends rotatably mounted on the shaft 11, or on an extension thereof, and its opposite free end carries an electric magnet 24. As shown clearly in Figure 2, the member 22 has an offset portion 25 which moves in the same path of travel as the magnet 24. It will be understood that this magnet contacting offset portion 25 should be made of a material which is magnetically permeable whether it is made integral with the member 22, as shown, or is in the form of a separate piece attached to the member. A spring 26 is attached to the arm 23 and to the vehicle structure at 27, and urges the arm 23 toward the member 22.

As a means of setting the arm 23 so that the head of the magnet 24 is spaced a desired distance from the offset 25, I provide a panel mounted pull knob 28 connected to a cable 29 which runs over suitably located pulleys 30 and 31 and connects to the arm 23.

Assuming that the knob 28 has been pulled outward by the operator to move the arm 23 into the position shown in Figure 1, and to hold it in that position against the influence of spring 26, and further assuming that the magnet 24 is energized, it is plain to see that the shaft 11 may be moved freely by the foot accelerator 10 to open the engine throttle a considerable amount without the offset 25 contacting or being affected in any way by the magnet 24. When the throttle is opened sufficiently, however, the offset 25 contacts the magnet 24, and the magnet holds the member 22 and consequently the shaft 11 against return to engine idling position. The throttle control shaft 11 thus remains under direct control of the magnet 24 until the magnet is de-energized and releases the shaft to the influence of spring 20. It will also be seen that the foot accelerator may be depressed to a maximum, if desired, without interference on the part of the arm 23. This arm is simply forced by the member 22 to move to the dotted line position of Figure 1, the flexible cable 29 simply slackening during this movement. When pressure on the foot accelerator is removed, the return movement of arm 23 is limited by the cable 29 to its original setting, and the member 22 and shaft 11 are also prevented from returning to engine idling position.

A circuit breaker 32 located on or beneath the instrument panel 5 provides primary control for the circuit which energizes the magnet 24, whereby the circuit as a whole may be rendered operative or inoperative. This circuit includes a battery 33, one pole of which is grounded as at 34, and the other pole of which is connected to one contact point of the ignition switch 6. Two additional circuit breakers 35 and 36 are placed in the circuit. These are in the form of normally open switches, the normal positions of their respective operating arms 37 and 38 being shown in broken lines in Figure 1. As will be seen, the free ends of the switch arms 37 and 38 are connected by cables 39 and 40 to the clutch and brake pedals respectively. The spring pressure which conventionally holds the clutch and brake pedals in normal position thus serves to hold the switches 35 and 36 closed. A lead wire 41 completes the circuit to one side of the magnet 24, the other side being grounded as indicated at 42.

With the circuit breaker 32 closed and the vehicle traveling with the clutch and brake pedals in the positions shown, the magnet 24 is continuously energized. When the accelerator is depressed a sufficient distance, the member 22 will be moved into contact with the magnet 24 and will be held by the magnet against returning to normal position. The vehicle will thus travel along a highway at a substantially constant speed, depending on the position in which the arm 23 has been set by the driver.

In case of a need to stop suddenly, the automatic reaction of the driver is to depress the brake, or both the clutch and brake. The instant this is done one or both of the switches 37 and 38 are allowed to open by a slackening of their respective control cables 39 and 40. As soon as the circuit to the magnet 24 is opened by one or the other of these switches, the member 22 is released by the magnet, and the throttle control shaft 11 is returned to engine idling position by the spring 20.

When entering a city, the vehicle driver would normally open the circuit breaker 32, thus rendering the entire system inoperative. However, should the driver overlook doing this, he is still protected against the magnet holding the throttle open during city driving. The reason for this is that the arm 23 would be set to take over control only after the throttle had been opened considerably more than is required for driving in high gear in the city. Should the throttle be opened excessively during acceleration in low or second gears, and should the member 22 come into contact with the magnet during that excessive acceleration, the throttle would not be held open because the required depression of the clutch to shift gears would break the circuit to the magnet, allowing the throttle to return to idling position each time gears were shifted.

From the above description it will be seen that the invention provides a throttle control mechanism which will relieve the driver of continuously applying pressure on the foot accelerator when driving at a substantially constant speed on the open highway; which may be set to maintain any desired road speed; which does not interfere in any way with acceleration to a higher speed than that at which the control has been set; which permits the throttle to be freely opened and closed within the range below the predetermined control point as set by the operator; and which may be rendered inoperative at any time by the operator.

It is believed that the invention has been described and illustrated with sufficient clarity to enable one familiar with the art to make and practice the invention. Having thus described the invention, I claim:

1. In an automotive vehicle provided with a carburetor throttle valve, a control shaft therefor, an accelerator, and operating linkage between the accelerator and shaft, an auxiliary control for the shaft comprising: a radially projecting arm rigidly affixed to said shaft to move in unison therewith; an electro-magnet; and means supporting said electro-magnet in the path of travel of said arm, whereby when the accelerator is depressed sufficiently the arm is moved into contact with the electro-magnet, and the arm, shaft and consequently the valve are prevented by the electro-magnet from returning to their respective engine idling positions when foot pressure on the accelerator is released.

2. The organization as described in claim 1 in which at least the electro-magnet contacting portion of the radially disposed arm is magnetically permeable.

3. In an automotive vehicle provided with a carburetor throttle valve, a control shaft therefor, an accelerator, operating linkage between the accelerator and shaft, and a brake pedal, an auxiliary control for the shaft comprising: an arm rigidly affixed to said shaft; an electro-magnet; movable means supporting said electro-magnet in the path of travel of said arm; means for selectively positioning the electro-magnet supporting means to vary the spacing between the electro-magnet and arm in their common path of travel; means for energizing said electro-magnet; and means cooperating with said brake pedal to de-energize said electro-magnet upon slight depression of the pedal.

4. In an automotive vehicle provided with a carburetor throttle valve, a control shaft therefor, an accelerator, operating linkage between the accelerator and shaft, and a clutch pedal, an auxiliary control for the shaft comprising: an arm rigidly affixed to said shaft; an electro-magnet; movable means supporting said electro-magnet in the path of travel of said arm; means for selectively positioning the electro-magnet supporting means to vary the spacing between the electro-magnet and arm in their common path of travel; means for energizing said electro-magnet; and means cooperating with said clutch pedal to de-energize said electro-magnet upon slight depression of the pedal.

5. In an automotive vehicle provided with a carburetor throttle valve, a control shaft therefor, an accelerator, operating linkage between the accelerator and shaft, a brake pedal, and a clutch pedal, an auxiliary control for said shaft comprising: an arm rigidly affixed to said shaft; an electro-magnet; movable means supporting said electro-magnet in the path of travel of said arm; means for selectively positioning the electro-magnet supporting means to vary the spacing between the electro-magnet and arm in their common path of travel; means for energizing said electro-magnet; and means cooperating with both said brake and clutch pedals to de-energize said electro-magnet upon slight depression of either pedal.

6. In an automotive vehicle provided with a carburetor throttle valve, a control shaft therefor, an accelerator, and operating linkage between the accelerator and shaft, an auxiliary control for the shaft comprising: an arm rigidly affixed to said shaft to move in unison therewith; an electro-magnet movable in the path of travel of said arm; means movably supporting the electro-magnet in said path of travel; means for energizing said electro-magnet; and means for selectively positioning the electro-magnet supporting means to vary the spacing between the arm in its neutral or engine idling position and the electro-magnet, said last mentioned means being yieldable in a direction away from the neutral position of the arm.

7. In an automotive vehicle provided with a carburetor throttle valve, a control shaft therefor, an accelerator, and operating linkage between the accelerator and shaft, an auxiliary control for the shaft comprising: an arm rigidly affixed to the shaft; an electro-magnet movable in the path of travel of said arm; means for energizing said electro-magnet; means movably supporting the electro-magnet in said path of travel; spring means urging the electro-magnet supporting means to move the electro-magnet toward the neutral or engine idling position of the arm; means for selectively positioning the electro-magnet supporting means against the influence of the spring means, the positioning means being yieldable in a direction away from the neutral position of the arm.

8. In an automotive vehicle provided with a carburetor throttle valve, a control shaft therefor, an accelerator, operating linkage between the accelerator and shaft, a brake pedal, and a clutch pedal, an auxiliary control for the shaft comprising: an arm rigidly affixed to said shaft; an electro-magnet movable in the path of travel of said arm; means for energizing said electro-magnet; means movably supporting the electro-magnet in said path of travel; means for selectively positioning the electro-magnet supporting means to vary the spacing between the arm in its natural position and the electro-magnet, said last mentioned means being yieldable in a direction away from the neutral position of the arm; and means cooperating with both said brake and clutch pedals to de-energize said electro-magnet upon slight depression of either pedal.

PAUL L. HOWLAND.

REFERENCES CITED

The following references are of record in the file of this patent:

UNITED STATES PATENTS

| Number | Name | Date |
|---|---|---|
| 1,290,443 | Wessolock | Jan. 7, 1919 |
| 2,021,832 | Callihan | Nov. 19, 1935 |
| 2,127,454 | Wolfe | Aug. 6, 1938 |
| 2,172,026 | Longley | Sept. 5, 1939 |